(12) United States Patent
Turner

(10) Patent No.: US 6,585,473 B2
(45) Date of Patent: Jul. 1, 2003

(54) MECHANICAL HANDLING APPARATUS

(75) Inventor: Steven Turner, Colwyn Bay (GB)

(73) Assignee: Joloda (International) Limited, Liverpool (GB)

( * ) Notice: Subject to any disclaimer, the term of this patent is extended or adjusted under 35 U.S.C. 154(b) by 0 days.

(21) Appl. No.: 09/923,907

(22) Filed: Aug. 6, 2001

(65) Prior Publication Data

US 2003/0017037 A1 Jan. 23, 2003

(30) Foreign Application Priority Data

Jul. 20, 2001 (GB) ................................. 0117763

(51) Int. Cl.$^7$ ................................................ B65G 13/00
(52) U.S. Cl. .................................... 414/535; 193/35 SS
(58) Field of Search ..................... 414/532, 535; 193/35 SS

(56) References Cited

U.S. PATENT DOCUMENTS 3,011,665 A * 12/1961 Wise ........................ 414/535
4,909,372 A * 3/1990 Jones ...................... 193/35 SS
5,350,048 A * 9/1994 Wylie ...................... 193/35 SS
6,382,385 B2 * 5/2002 Ransil et al. ............ 193/35 SS

FOREIGN PATENT DOCUMENTS

| EP | 1055617 | * | 11/2000 | |
| FR | 2573372 | * | 5/1986 | ............... 414/535 |

* cited by examiner

*Primary Examiner*—Steven A. Bratlie
(74) *Attorney, Agent, or Firm*—Marshall, Gerstein & Borun

(57) ABSTRACT

A mechanical handling apparatus comprising a support surface for supporting a load, and a plurality of rollers, each roller being rotatably mounted on an axle for moving a load over the support surface, the support surface comprising an aperture for each roller so that either the rollers or the support surface can be moved between a first position in which at least a part of each roller is proud of the support surface and a second position in which each roller is substantially flush with or recessed below the support surface, and at least two rollers being mounted on each axle.

1 Claim, 3 Drawing Sheets

MECHANICAL HANDLING APPARATUS

FIELD OF THE INVENTION

The invention relates to mechanical handling apparatus, and more particularly a support surface with roller devices where the rollers can be selectively positioned between raised and lowered positions relative to the surrounding support surface.

Mechanical handling apparatus is known which comprises a row of rollers which is supported by an inflatable device so that when the device is inflated at least a part of the rollers stands above a support surface and renders any goods on the rollers mobile. When the device is deflated the rollers are retracted wholly below the support surface, leaving the goods immobile on the surface. A row of apertures is provided in the support surface to allow the rollers to be moved from the retracted position to the protruding position, one aperture being provided for each roller.

BACKGROUND OF THE INVENTION

A problem with the known apparatus is that debris can fall through the apertures provided in the support surface, and that debris can then puncture the inflatable device. A channel-shaped body is provided beneath the row of rollers in order to try and prevent any debris which falls through the apertures from puncturing the inflatable device, but the body has open ends and so cannot entirely prevent debris from falling onto the inflatable device.

SUMMARY OF THE INVENTION

The invention seeks to mitigate this problem.

According to a first aspect of the invention there is provided mechanical handling apparatus comprising a support surface for supporting a load, and a plurality of rollers, each roller being rotatably mounted on an axle for moving a load over the support surface, the support surface comprising an aperture for each roller so that either the rollers or the support surface can be moved between a first position in which at least a part of each roller is proud of the support surface and a second position in which each roller is substantially flush with or recessed below the support surface, at least two rollers being mounted on each axle.

By providing at least two rollers on each axle, with an aperture for each roller, rather than one roller on each axle and one aperture as in the known device, it becomes possible to reduce the size of the apertures thereby reducing the amount of debris that can fall through the apertures.

The apparatus may comprise a body which forms an open-topped enclosure about the rollers to prevent debris which falls through the apertures from exiting the body.

The body may be channel-shaped having two end plates.

The apparatus may comprise means for moving the body so that the rollers move between the first position and the second position.

The moving means may be inflatable, in which case, having a body which forms an open-topped enclosure about the rollers will prevent debris from puncturing the inflatable moving means.

According to a second aspect of the invention there is provided mechanical handling apparatus comprising a support surface for supporting a load, and a body including a plurality of rollers for moving a load over the support surface, the support surface comprising an aperture for each roller so that either the rollers or the support surface can be moved between a first position in which at least a part of each roller is proud of the support surface and a second position in which each roller is substantially flush with or recessed below the support surface, the body forming an open-topped enclosure about the rollers so as to prevent debris which falls through the apertures from exiting the body.

BRIEF DESCRIPTION OF THE DRAWINGS

One way of carrying out the invention is described in detail below, by way of example, with reference to the accompanying drawings in which.

DETAILED DESCRIPTION OF THE INVENTION

Figure 1:
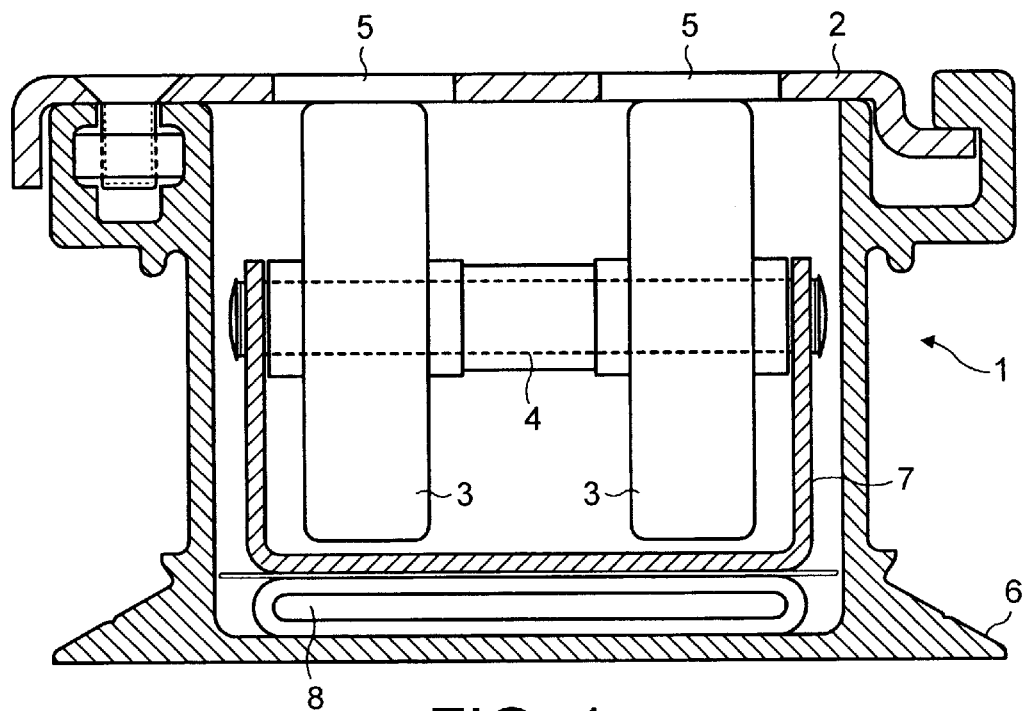
FIG. 1 is a vertical sectional view of mechanical handling apparatus in accordance with the invention with the rollers in their first position.
Figure 2:
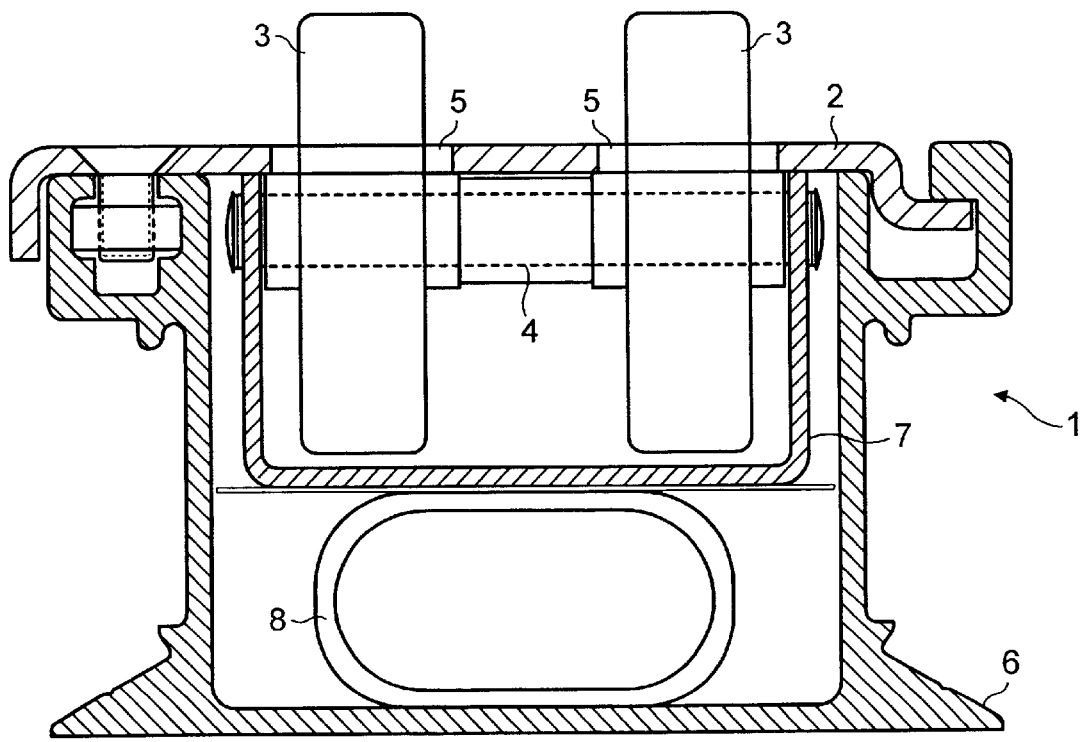
FIG. 2 is a vertical sectional view of the apparatus of FIG. 1 with the rollers in their second position.
Figure 3:
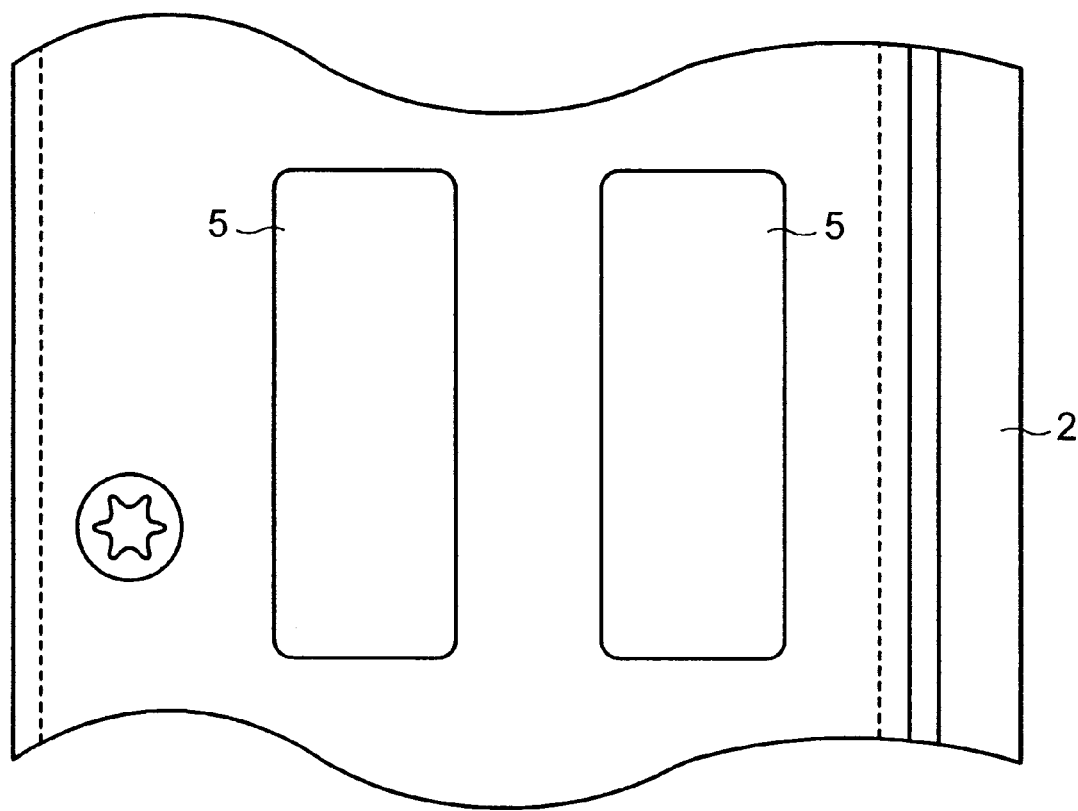
FIG. 3 is a plan view of a part of the apparatus of FIG. 1.
Figure 4:
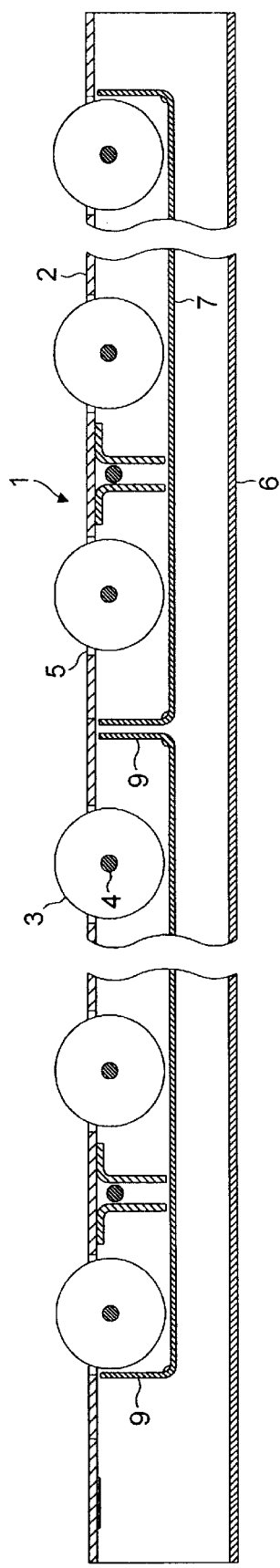
FIG. 4 is a side sectional view of the apparatus of FIG. 1.

The drawings show mechanical handling apparatus 1 comprising a support surface 2 for supporting a load, and a plurality of rollers 3, each roller 3 being rotatably mounted on an axle 4 for moving a load over the support surface 2, the support surface 2 comprising an aperture 5 for each roller 3 so that either the rollers 3 or the support surface 2 can be moved between a first position in which at least a part of each roller 3 is proud of the support surface 2 and a second position in which each roller 3 is substantially flush with or recessed below the support surface 2, at least two rollers 2 being mounted on each axle 4.

The apparatus 1 comprises a channel-shaped housing 6 which is closed by a releasable top plate 2 (the support surface). The housing 6 contains a plurality of channel-shaped bodies 7, each having a plurality of rollers 3 mounted therein on a series of parallel axles 4 which extend across the width of the channel-shaped body 7. There are two rollers 3 on each axle 4. The top plate 2 comprises an aperture 5 for each roller 3, each roller 3 being vertically aligned with its associated aperture 5.

The housing 6 contains an inflatable air bag 8 which is positioned beneath the channel-shaped bodies 7. The air bag 8 is connected to an air supply (not shown), which may be the existing air supply of a vehicle. The air bag 8 may be inflated so that it moves the channel-shaped bodies 7, and thus the rollers 3, from their second position (shown in FIG. 1) in which the rollers 3 are recessed below the top plate 2 to their first position (shown in FIG. 1) in which part of the rollers 3 is proud of the top plate 2. If there is a load supported on the top plate 2, the load will then be lifted clear of the top plate 2 by the rollers 3. The load can then be moved over the rollers 3.

The clearance between each roller 3 and its associated aperture 5 is such as to minimize the amount of debris that can enter each channel-shaped body 7. Because there are two small rollers 3 on each axle 4, having two small apertures associated therewith, rather than one large roller having one large aperture associated therewith as in known mechanical handling apparatus, the amount of debris that can enter each channel-shaped body 7 is further reduced.

In case any debris does enter the channel-shaped bodies 7, each body is provided with two end plates 9 so that the channel-shaped body 7 forms an open-topped enclosure about the rollers 3, thereby preventing debris from falling out of the body 7 to a part of the housing 6 where it could puncture the air bag 8.

I claim:

1. Mechanical handling apparatus comprising in combination:

(i) an elongate support surface for supporting a load, said elongate support surface having a length and a width, and wherein the width is narrower than the length, (ii) a plurality of rollers, each roller being rotatably mounted on an axle for moving a load over said support surface and wherein there are a plurality of said axles mounted in spaced parallel relation one behind the other along the length of said elongate support surface, (iii) said support surface comprising an aperture for each said roller so that said rollers can be moved between a first position in which at least a part of each said roller is proud of said support surface and a second position in which each said roller is substantially flush with or recessed below said support surface, at least two said rollers being mounted on each said axle, (v) a body which forms an elongate open-topped enclosure about said rollers and is channel shaped and has two end plates so as to prevent debris which falls through said apertures from exiting said body and coming into contact with the moving means, and (iv) means for moving said body so that said rollers move between said first position and said second position, and wherein said moving means is inflatable.

* * * * *

UNITED STATES PATENT AND TRADEMARK OFFICE
CERTIFICATE OF CORRECTION

PATENT NO. : 6,585,473 B1  Page 1 of 1
DATED : July 1, 2003
INVENTOR(S) : Steven Turner It is certified that error appears in the above-identified patent and that said Letters Patent is hereby corrected as shown below:

Column 3,
Line 12, replace "the" with -- said --.

Signed and Sealed this

Thirtieth Day of September, 2003

JAMES E. ROGAN
*Director of the United States Patent and Trademark Office*